US012613427B2

(12) United States Patent
Liu et al.

(10) Patent No.: US 12,613,427 B2
(45) Date of Patent: Apr. 28, 2026

(54) NEAR-EYE LIGHT-FIELD DISPLAY APPARATUS AND METHOD FOR DISPLAYING LIGHT FIELD

(71) Applicant: PetaRay Inc., New Taipei City (TW)

(72) Inventors: Chang-Le Liu, New Taipei City (TW); Chun-Hao Chao, New Taipei City (TW); Homer Chen, New Taipei City (TW)

(73) Assignee: PETARAY INC., New Taipei City (TW)

(*) Notice: Subject to any disclaimer, the term of this patent is extended or adjusted under 35 U.S.C. 154(b) by 869 days.

(21) Appl. No.: 17/936,573

(22) Filed: Sep. 29, 2022

(65) Prior Publication Data

US 2023/0176393 A1      Jun. 8, 2023

Related U.S. Application Data

(60) Provisional application No. 63/286,036, filed on Dec. 4, 2021.

(51) Int. Cl.
| | |
|---|---|
| *G02B 27/30* | (2006.01) |
| *G02B 19/00* | (2006.01) |
| *G02B 27/01* | (2006.01) |
| *G02B 27/14* | (2006.01) |
| *G06T 7/557* | (2017.01) |
| *H04N 13/161* | (2018.01) |
| *H04N 13/282* | (2018.01) |
| *H04N 13/30* | (2018.01) |

(52) U.S. Cl.
CPC ......... *G02B 27/30* (2013.01); *G02B 19/0028* (2013.01); *G02B 27/0172* (2013.01); *G02B 27/148* (2013.01); *G06T 7/557* (2017.01); *H04N 13/161* (2018.05); *H04N 13/282* (2018.05); *H04N 13/30* (2018.05); *G06T 2207/10052* (2013.01)

(58) Field of Classification Search
CPC ... G02B 27/01–0189; G02B 2027/0105–0198; G02B 19/00–0095; G06T 2207/00–30268; G06T 7/00–97; H04N 13/00–398
See application file for complete search history.

(56) References Cited

U.S. PATENT DOCUMENTS

2017/0270637 A1* 9/2017 Perreault ........... G02B 27/0172
2021/0321081 A1* 10/2021 Appelgate ........... H04N 13/111

* cited by examiner

*Primary Examiner* — Christopher A Lamb, II
(74) *Attorney, Agent, or Firm* — McClure, Qualey & Rodack, LLP

(57) ABSTRACT

A near-eye light-field display apparatus is provided, which includes a display module, a first lens module, an aperture device, and a second lens module. The display module displays light-field data. The first lens module collimates light rays emitted from the display module. The aperture device generates a plurality of coded apertures. The collimated light rays are modulated by the coded apertures. The second lens module focuses the modulated light rays on an image plane to form a real image.

15 Claims, 8 Drawing Sheets

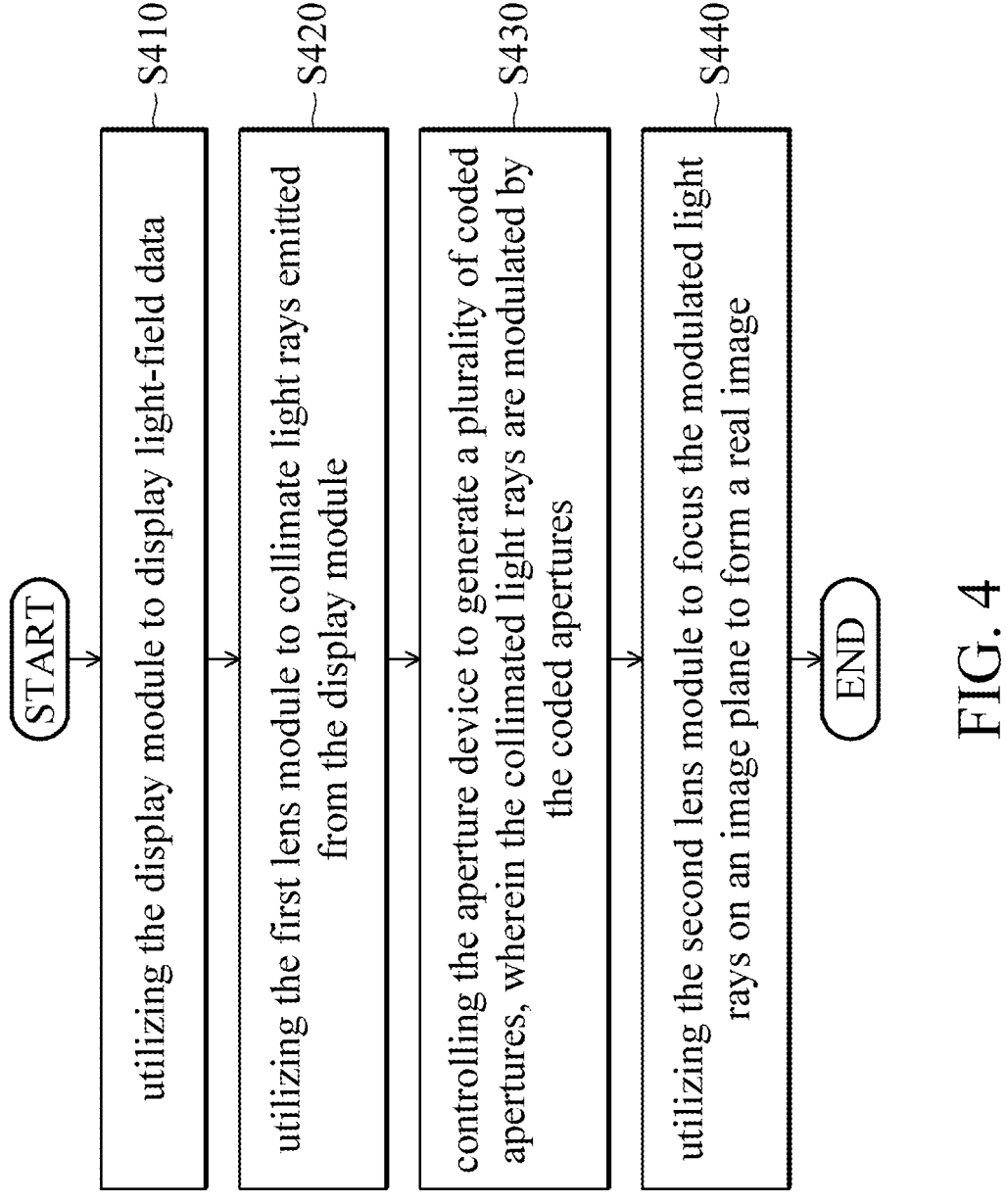

S410 utilizing the display module to display light-field data

S420 utilizing the first lens module to collimate light rays emitted from the display module S430 controlling the aperture device to generate a plurality of coded apertures, wherein the collimated light rays are modulated by the coded apertures S440 utilizing the second lens module to focus the modulated light rays on an image plane to form a real image

FIG. 4

NEAR-EYE LIGHT-FIELD DISPLAY APPARATUS AND METHOD FOR DISPLAYING LIGHT FIELD

CROSS REFERENCE TO RELATED APPLICATIONS

This application claims the benefit of U.S. Provisional Application No. 63/286,036, filed Dec. 4, 2021, the entirety of which is incorporated by reference herein.

BACKGROUND OF THE INVENTION

Field of the Invention

The present invention relates to display apparatuses, and, in particular, to a near-eye light-field display apparatus and a method for displaying a light field.

Description of the Related Art

Conventional augmented-reality (AR) displays suffer from vergence-accommodation conflict (VAC) since they render a scene at a single depth, which causes visual fatigue and eye strain for users. Some conventional near-eye displays are designed to solve the VAC problem, however, they require additional complex elements. For example, varifocal displays require complicated elements such as eye trackers, and holographic displays often require high-resolution spatial light modulators.

Accordingly, there is a demand for a near-eye light-field display apparatus to solve the aforementioned problem.

BRIEF SUMMARY OF THE INVENTION

In an exemplary embodiment, a near-eye light-field display apparatus is provided, which includes a display module, a first lens module, an aperture device, and a second lens module. The display module displays light-field data. The first lens module collimates light rays emitted from the display module. The aperture device generates a plurality of coded apertures. The collimated light rays are modulated by the coded apertures. The second lens module focuses the modulated light rays on an image plane to form a real image.

In some embodiments, the light-field data comprises a plurality of first images that are displayed in a predetermined order.

In some embodiments, the coded apertures correspond to the first images, and each of the coded apertures is generated in the predetermined order in synchronization with each of the first images displayed by the display module.

In some embodiments, the first images are sub-view images of a light field. Alternatively, the first images are coded sub-view images of a coded light field.

In some embodiments, the coded light field is a transformed light field.

In some embodiments, the first lens module comprises a plurality of first lenses, which comprise a meniscus lens, a biconvex lens, a biconcave lens, and a plano-convex lens arranged in series.

In some embodiments, the second lens module comprises a plurality of second lenses, which comprise a plano-convex lens, a biconcave lens, a biconvex lens, and a meniscus lens arranged in series.

In some embodiments, the focused light rays reach an eye pupil of a viewer of the near-eye light-field display apparatus through an eyepiece module.

In some embodiments, the near-eye light-field display apparatus further includes a control circuit, controlling the display module and the aperture device. In response to the first images being sub-view images of a light field, the control circuit performs a light-field encoding network to transform the sub-view images of the light field into coded sub-view images to be displayed on the display module.

In some embodiments, the light-field encoding network is a convolutional neural network.

In some embodiments, the control circuit and the light-field encoding network are implemented by a hardware circuit. Alternatively, the control circuit is implemented by a central processing unit, a general-purpose processor, or a microcontroller.

In some embodiments, each coded sub-view image defines a pupil function of the aperture device of the near-eye light-field display apparatus.

In some embodiments, the pupil function and a phasor jointly define an optical transfer function, and the output sub-view image of the optical transfer function is obtained by performing convolution on an input sub-view image and a point spread function, wherein the point spread function is an inverse Fourier transform of the optical transfer function.

In another exemplary embodiment, a method for displaying a light field, for use in a near-eye light-field display apparatus, is provided. The near-eye light-field display apparatus includes a display module, a first lens module, an aperture device, and a second lens module. The method includes the following steps: utilizing the display module to display light-field data; utilizing the first lens module to collimate light rays emitted from the display module; controlling the aperture device to generate a plurality of coded apertures, wherein the collimated light rays are modulated by the coded apertures; and utilizing the second lens module to focus the modulated light rays on an image plane to form a real image.

In some embodiments, the light-field data comprises a plurality of first images that are displayed in a predetermined order.

In some embodiments, the coded apertures correspond to the first images, and the method further comprises: generating each of the coded apertures in the predetermined order in synchronization with each of the first images displayed by the display module.

In some embodiments, the first images are sub-view images of a light field or coded sub-view images of a coded light field.

In some embodiments, the method further includes the following step: in response to the first images being sub-view images of a light field, performing a light-field encoding network to transform the sub-view images of the light field into coded sub-view images to be displayed on the display module.

BRIEF DESCRIPTION OF THE DRAWINGS

The present invention can be more fully understood by reading the subsequent detailed description and examples with references made to the accompanying drawings, wherein:

FIG. 4 is a method for displaying a light-field image in accordance with an embodiment of the invention.

DETAILED DESCRIPTION OF THE
INVENTION

The following description is made for the purpose of illustrating the general principles of the invention and should not be taken in a limiting sense. The scope of the invention is best determined by reference to the appended claims.

It should be understood that the words "comprising", "including" and the like used in this specification are used to indicate the existence of specific technical characteristics, numerical values, method steps, work processes, components and/or components, but not It does not exclude that you can add more technical features, values, method steps, job processing, components, components, or any combination of the above.

The terms such as "first", "second", and "third" are used in the claims to modify the elements in the claims, and are not used to indicate that there is a priority order, prior relationship, or is a component before another component, or the time sequence when performing method steps, only used to distinguish components with the same name.

Figure 1A:
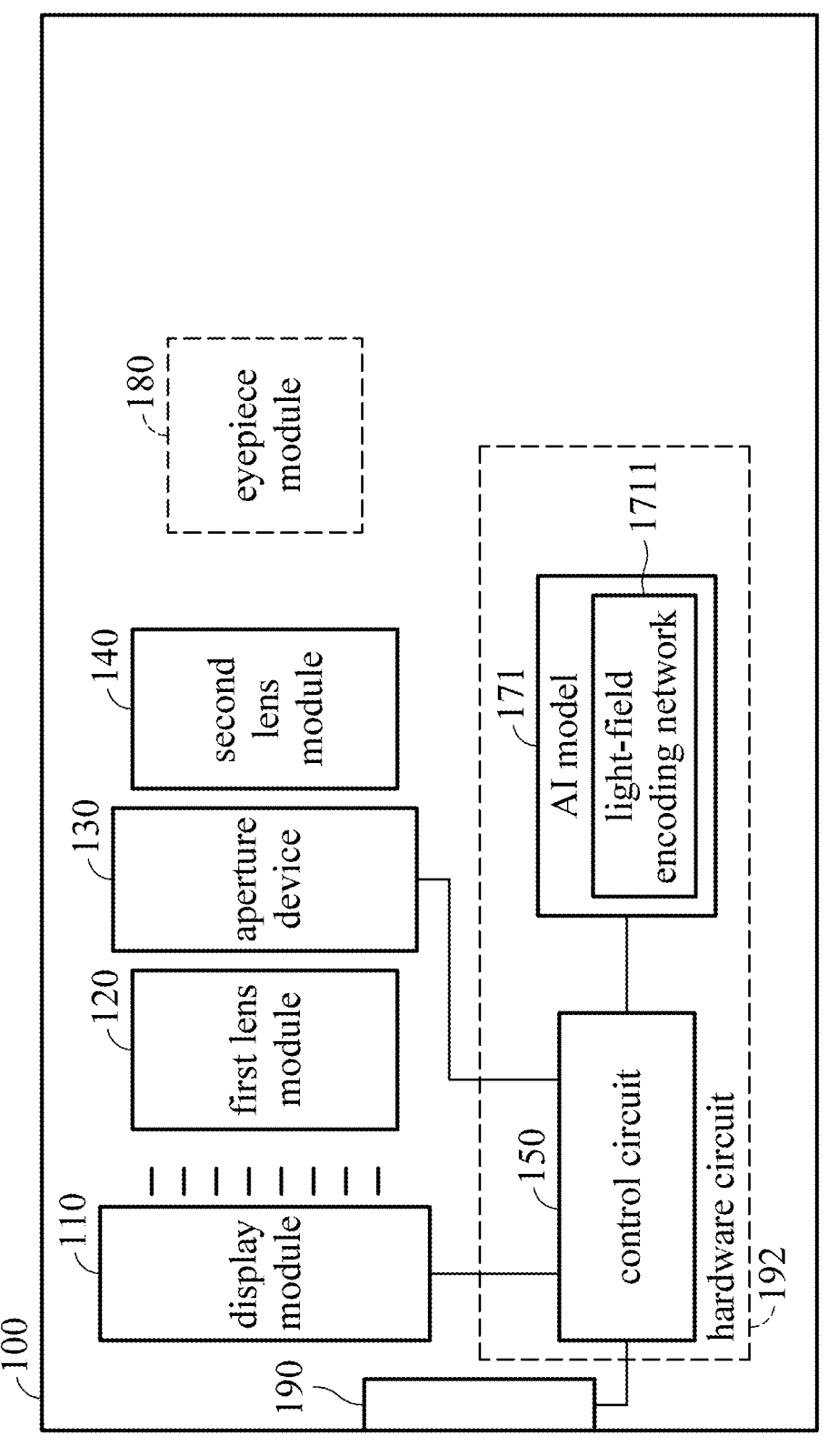
FIG. 1A is a block diagram of a near-eye light-field display apparatus in accordance with an embodiment of the invention.
Figure 1B:
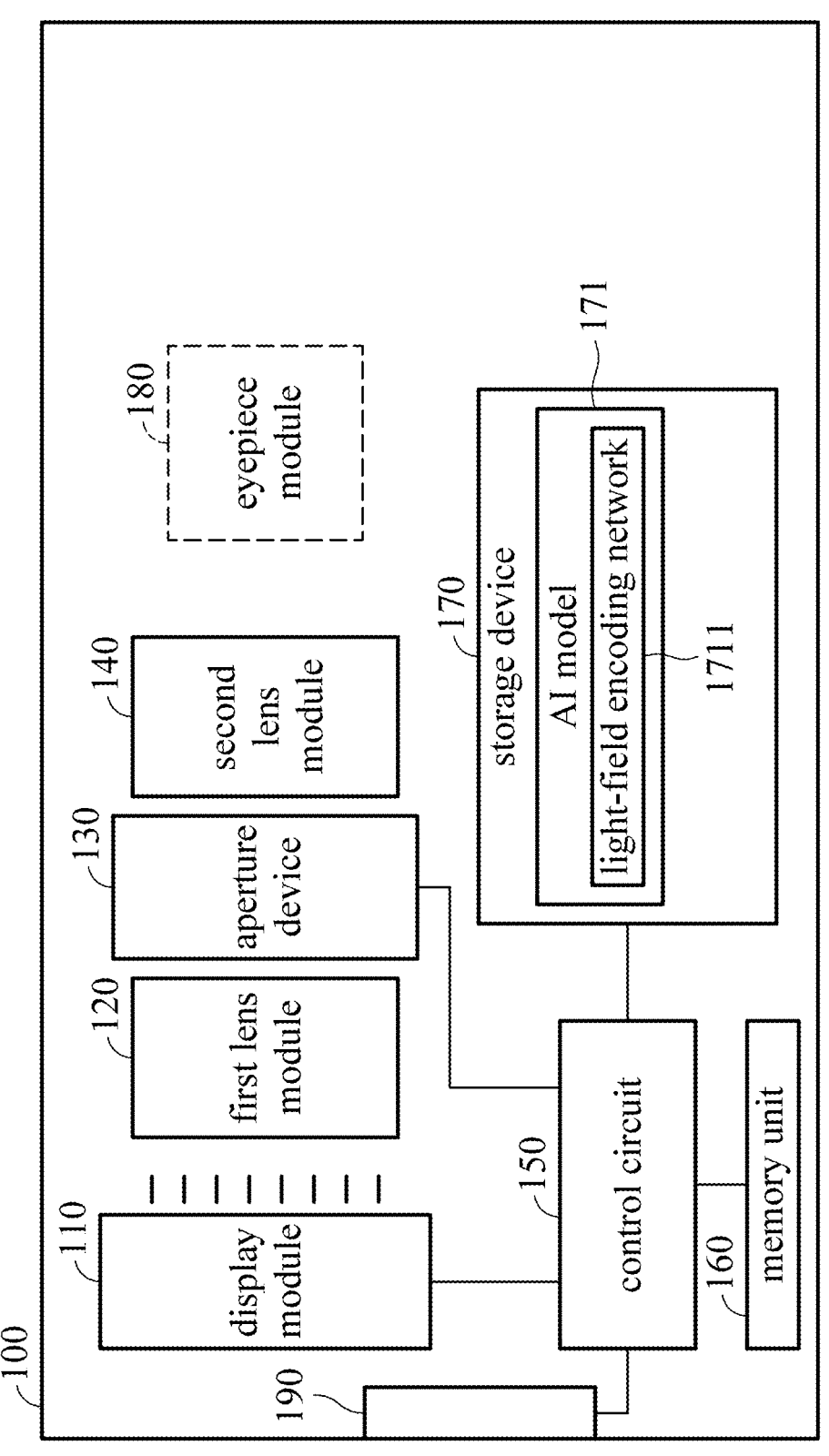
FIG. 1B is a block diagram of a near-eye light-field display apparatus in accordance with another embodiment of the invention.

FIG. 1A is a block diagram of a near-eye light-field display apparatus in accordance with an embodiment of the invention. FIG. 1B is a block diagram of a near-eye light-field display apparatus in accordance with another embodiment of the invention.

As shown in FIG. 1A, the near-eye light-field display apparatus 100 may include a display module 110, a first lens module 120, an aperture device 130, a second lens module 140, and a control circuit 150. The display module 110 may be implemented by a liquid-crystal display panel, a light-emitting diode (LED) display panel, a micro LED display panel, a laser-beam scanner, but the invention is not limited thereto. In some embodiments, the near-eye light-field display apparatus 100 may be a near-eye light-field display apparatus such as a pair of light-field augmented-reality (AR) glasses or a head-mounted display (HMD). It indicates that the display module 110 of the near-eye light-field display apparatus 100 may include a left-eye display and a right-eye display (both not shown in FIG. 1) which facilitate the viewer to perceive augmented reality using light-field data.

The first lens module 120 may be a set of collimation lenses that is used to collimate light rays emitted from the display module 110. The aperture device 130 may be a coded aperture device that is used to decode different coded sub-view images using different coded apertures, where each coded sub-view image is displayed in synchronization with a corresponding coded aperture. For example, the light rays passing through the first lens module 120 are "modulated" by coded apertures controlled by the aperture device 130, where the details of the aperture device 130 will be described later. In some embodiments, the aperture device 130 may be implemented by a liquid-crystal cell array that is controlled by the control circuit 150. For example, the rotation angle and transparency/opacity of each liquid-crystal cell can be adjusted by applying different driving voltages to each liquid-crystal cell.

The second lens module 140 may be a set of focusing lenses that is used to focus the modulated light rays to form a real image. The light rays passing through the second lens module 140 reach the eye pupil 195 of the user through an eyepiece module 180. Accordingly, the light rays are perceived by the user as being emitted from an almost infinitely far-off place.

The artificial-intelligence model 171 may be used to optimize the sub-view images to be displayed on the display module 110 and to optimize the aperture patterns generated by the aperture device 130. In some embodiments, the control circuit 150 may be implemented by an application-specific integrated circuit (ASIC), a field-programmable gate array (FPGA), or other functionally-equivalent circuits, but the invention is not limited thereto. In addition, the control circuit 150 and the AI model 171 can be integrated into the same hardware circuit 192, such as an integrated circuit, an FPGA, or a system-on-chip (SoC).

For example, the control circuit 150 may obtain an input light field or input sub-view images of a light field from a host via the transmission interface 190. The transmission interface 190 may include wired transmission interfaces and/or wireless transmission interfaces. The wired transmission interfaces may include: high definition multimedia interface (HDMI), DisplayPort (DP) interface, embedded DisplayPort (eDP) interface, universal serial bus (USB) interface, USB Type-C interface, Thunderbolt interface, digital video interface (DVI), video graphics array (VGA) interface, general purpose input/output (GPIO) interface, universal asynchronous receiver/transmitter (UART) interface, serial peripheral interface (SPI), inter-integrated circuit (I2C) interface, or a combination thereof. The wireless transmission interfaces may include Bluetooth, Wi-Fi, near-field communication (NFC) interface, etc., but the invention is not limited thereto.

Please refer to FIG. 1B. In some embodiments, the control circuit 150 may be implemented by a central processing unit (CPU), a general-purpose processor, or a microcontroller, but the invention is not limited thereto. In addition, the near-eye light-field display apparatus 100 may further include a memory unit 160 and a storage device 170.

The memory unit 160 may be a random access memory such as a static random access memory (SRAM) or a dynamic random access memory (DRAM), but the invention is not limited thereto. The storage device 170 may be a non-volatile memory such as a hard-disk drive, a solid-state disk (SSD), a flash memory, or a read-only memory (ROM), but the invention is not limited thereto. The storage device 170 may store the artificial-intelligence model 171 (e.g., a software module in FIG. 1B) which is used to optimize the sub-view images to be displayed on the display module 110 and to optimize the aperture patterns generated by the aperture device 130.

In an embodiment, the control circuit 150 may be used to control the display module 110 and the aperture device 130. In addition, the control circuit 150 may determine whether an input light field received from the transmission interface 190 is an ordinary light field (e.g., including a plurality of sub-view images) or a coded light field (e.g., including a plurality of coded sub-view images). In response to the input light field being an ordinary light field or input sub-view images being ordinary sub-view images, the AI model 171 executed by the control circuit 150 may convert the input sub-view images of the input light field into coded sub-view images suitable for the near-eye light-field display apparatus 100. In response to the input light field being a coded light-field or input sub-view images being coded sub-view images, the control circuit 150 may transmit each input sub-view image to the display module 110 in sequence for playback.

In embodiment, the VAC can be mitigated by directly projecting light rays into the viewer's eye using the near-eye light-field display apparatus 100. For example, all sub-views in a light field can be directly projected into the viewer's eye. When the viewer changes his or her focus to a near position, the viewer can perceive an image at a shorter focal distance. When the viewer changes his or her focus to a far position, the viewer can perceive an image at a longer focal distance. Such design of the display can be referred to as an integral-imaging-based (II-based) display.

The integral-imaging-based display can be achieved using a spatial-domain multiplexing (SDM) light-field display or a time-domain multiplexing (TDM) light-field display. However, the SDM light-field display suffers from spatial-angular resolution tradeoff. Although a conventional TDM light-field display can retain original spatial resolution, it may suffer from aliasing due to low angular resolution, so does conventional SDM light-field displays.

Figure 2A:
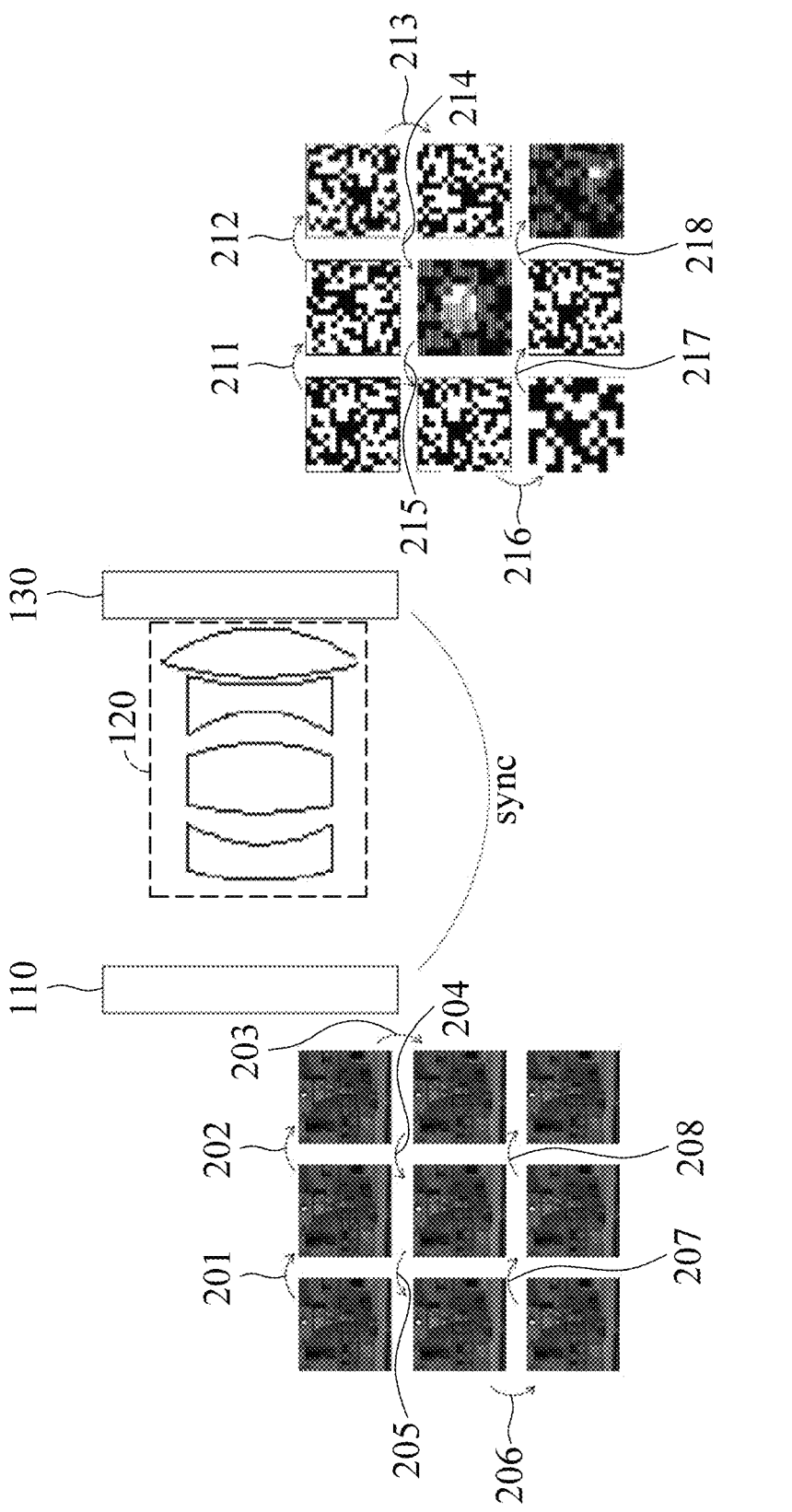
FIG. 2A is a diagram showing the coded time-domain multiplexing technique used in the near-eye light-field display apparatus in accordance with the embodiment of FIG. 1.
Figure 2B:
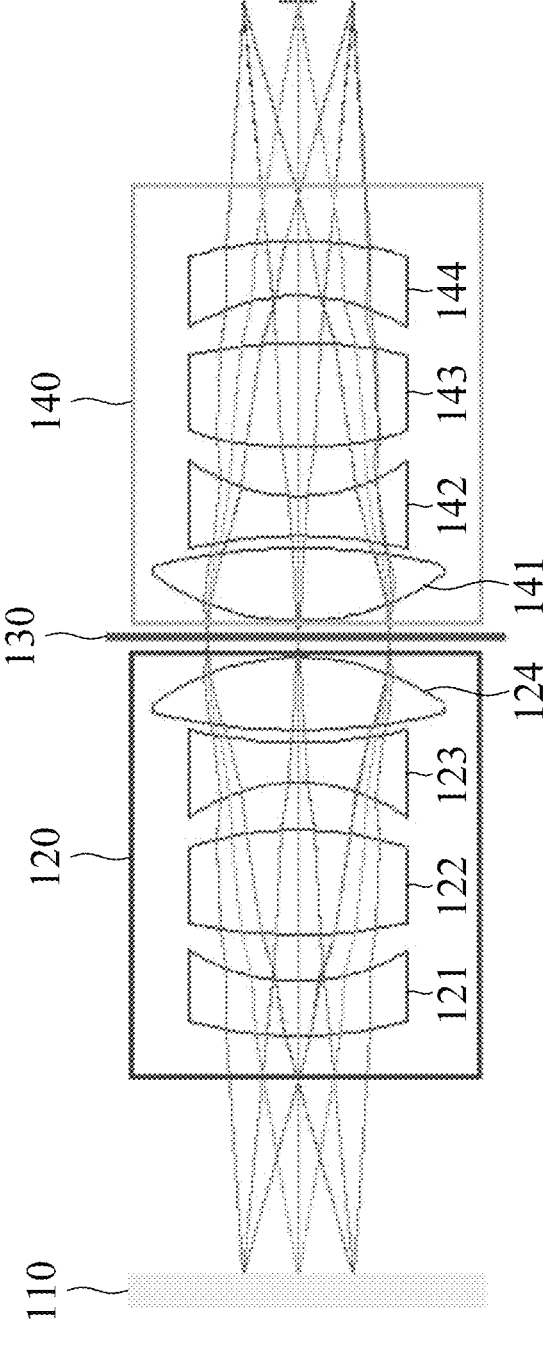
FIGS. 2B-2C are diagrams of the light paths within the near-eye light-field display apparatus in accordance with the embodiment of FIG. 1.
Figure 2C:
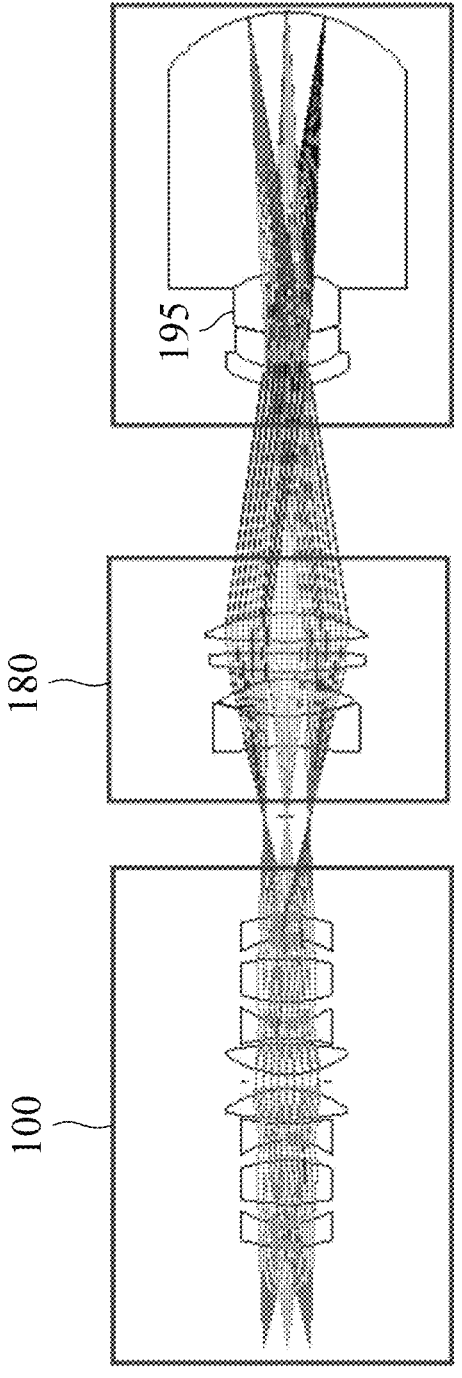

FIG. 2A is a diagram showing the coded time-domain multiplexing technique used in the near-eye light-field display apparatus in accordance with the embodiment of FIG. 1. FIGS. 2B-2C are diagrams of the light paths within the near-eye light-field display apparatus in accordance with the embodiment of FIG. 1. Please refer to FIG. 1 and FIGS. 2A-2C.

In an embodiment, a coded TDM technique is used in the near-eye light-field display apparatus 100 to solve the aliasing problem of the output light field in conventional SDM/TDM light-field displays. For example, the light field to be displayed by the display module 110 may be a coded light field which includes a plurality of coded sub-view images, as shown in FIG. 2. The coded sub-view images may be generated by the control circuit 150 which uses coded aperture imaging technique plus deep learning, where the details will be described later. The display module 110 may display the coded sub-view images in a predetermined order, such as from arrows 201 to 208. It should be noted that each coded sub-view image is displayed in synchronization with a corresponding coded aperture used by the aperture device 130, as shown by arrows 211 to 218 in FIG. 2A.

As depicted in FIG. 2B, the light paths start from the display module 110 and pass through the first lens module 120, the aperture device 130, and the second lens module 140 in sequence. For example, the light rays emitted from the display module 110 are collimated by the first lens module 120, and the collimated light rays are modulated by the aperture device 130. Given that the light rays emitted from the display module 110 correspond to a light field (i.e., including a plurality of sub-view images), the collimated light rays which are modulated by the aperture device 130 are regarded as coded sub-view images. The modulated light rays are focused by the second lens module 140 to form a real image. Moreover, such light rays after passing through the second lens module 140 reach the eye pupil 195 of the user through the eyepiece module 180, as shown in FIG. 2C.

In FIG. 2B, the first lens module 120 may include a meniscus lens 121, a biconvex lens 122, a biconcave lens 123, and a plano-convex lens 124 arranged in series from left to right. The second lens module 140 may include a plurality of second lenses, which comprise a plano-convex lens 141, a biconcave lens 142, a biconvex lens 143, and a meniscus lens 144 arranged in series from left to right. It should be noted that the implementations of the first lens module 120 and second lens module 140 in FIG. 2B are for purposes of description, and one having ordinary skill in the art can modify the combination of lenses in the first lens module 120 and the second lens module 140 according to practical needs.

Figure 3A:
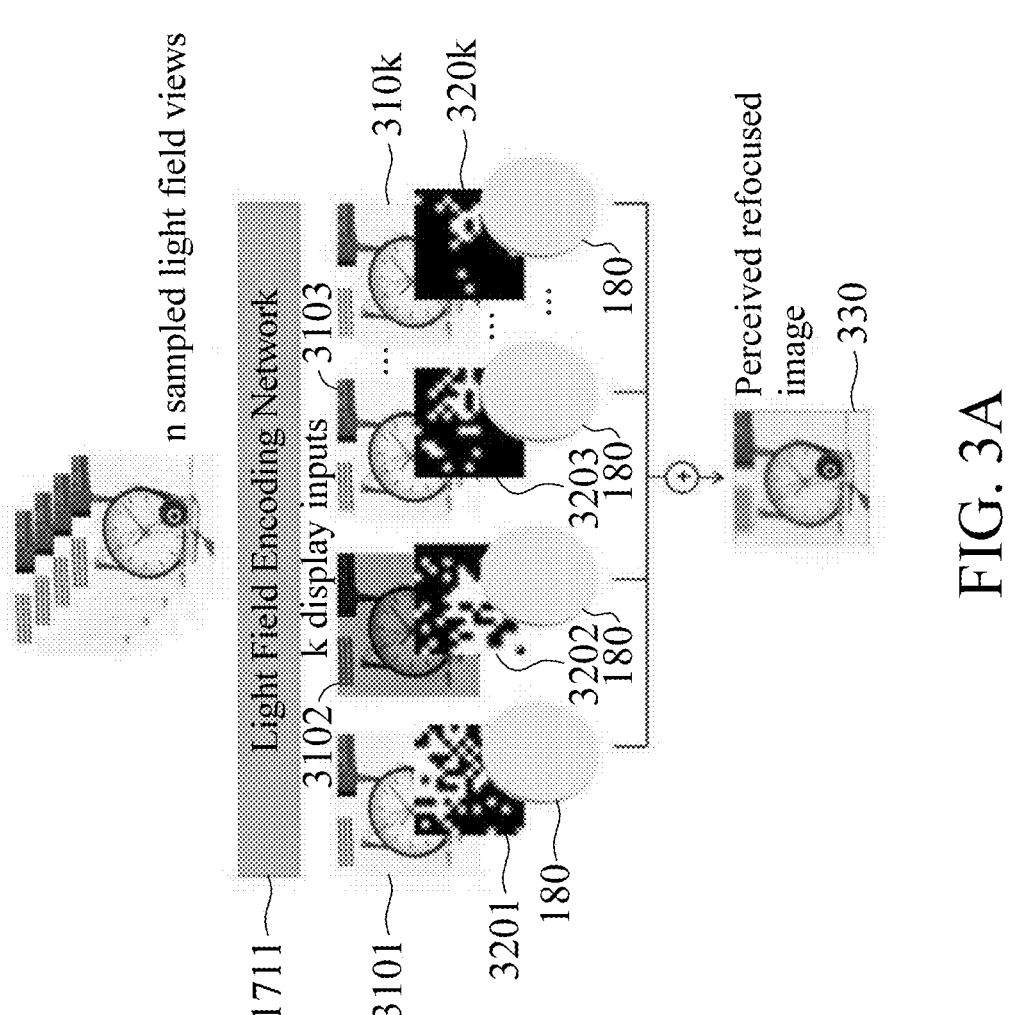
FIG. 3A is a diagram showing the light-field encoding network in accordance with an embodiment of the invention.
Figure 3B:
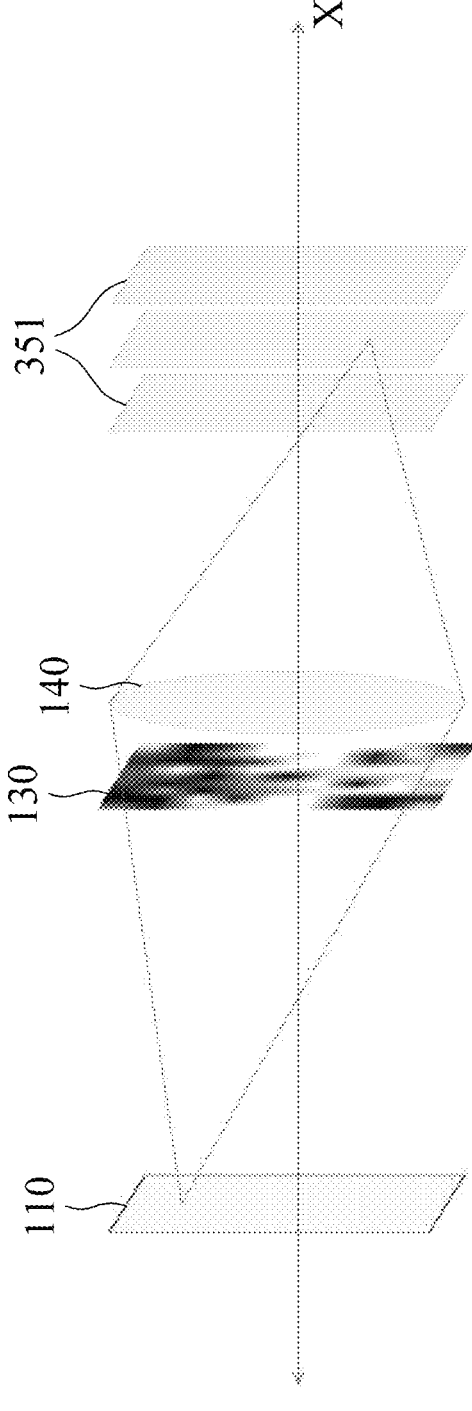
FIG. 3B is a diagram of modeling a display pipeline with Fourier optics in accordance with an embodiment of the invention.

FIG. 3A is a diagram showing the light-field encoding network in accordance with an embodiment of the invention. FIG. 3B is a diagram of modeling a display pipeline with Fourier optics in accordance with an embodiment of the invention. Please refer to FIG. 1 and FIG. 3A-3B.

In an embodiment, the input coded light field and the coded aperture patterns in the pipeline of the near-eye light-field display apparatus 100 are modeled with differentiable functions. In addition, the coded light field and the coded aperture patterns are optimized via machine-learning techniques such as a convolutional neural network (CNN), deep learning, etc., but the invention is not limited thereto. For example, the artificial-intelligence model 171 (e.g., a software module) executed by the control circuit 150 (or a host) may transform sub-view images to images that are more suitable for the near-eye light-field display apparatus 100.

For example, the AI model 171 may include a light-field encoding network 1711, which may be implemented by a convolutional neural network (CNN). The light-field encoding network 1711 is capable of mapping sub-view images into first images that are displayed on the display module 110. In some embodiments, the first images can be regarded as coded sub-view images, and these coded sub-view images can be collectively regarded as a coded light field. In other words, the coded light field may be a transformed light field of any type, e.g., using any existing or later developed techniques for transforming sub-view images into coded sub-view images.

In addition, the light-field encoding network 1711 is also capable of adjusting the aperture pattern of the aperture device corresponding to the currently displayed first image. For example, the light rays passing through the aperture device 130 can be dynamically changed based on the aperture pattern of the aperture device 130 corresponding to the currently displayed first image.

In an embodiment, during the training phase of the AI model 171, sampled sub-view images are input to the AI model 171. The control circuit 150 can control the aperture device 130 to change the aperture pattern based on the corresponding sampled sub-view image.

Specifically, given that n sampled sub-view images are input to the near-eye light-field display apparatus 100, the light-field encoding network 1711 can map these sampled sub-view images to k coded sub-view images, where n and k are positive integers depending on the hyperparameters of the light-field encoding network 1711. Meanwhile, since k sub-view images are generated by the light-field encoding network 1711, the control circuit 150 also controls the aperture device 130 to generate k aperture patterns corresponding to the k sub-view images.

In an embodiment, the output coded sub-view image of the near-eye light-field display apparatus 100 at each atomic time step can be regarded as a convolved version of the display input (i.e., the sub-view image displayed on the display module 110). The output coded sub-view image is projected to the viewer's eye (e.g., through the eyepiece module 180), and the viewer can perceive the output coded sub-view images as a refocused image due to persistence of vision.

Specifically, the display pipeline of the near-eye light-field display apparatus 100 can retain original spatial resolution of the input sub-view image, and the problem of low input angular resolution and aliasing of the output sub-view image in conventional SDM/TDM light-field displays can be solved by the near-eye light-field display apparatus 100 which uses an artificial-intelligence model 171 to optimize the sub-view images to be displayed on the display module 110 and to optimize the aperture patterns generated by the aperture device 130.

Specifically, the coded aperture may define a pupil function of the aperture device 130, and each display plane located at a F is associated with a two-dimensional phasor (i.e., related to a), where a denotes a scaling factor, and F denotes the focal length of the lens (or compound lenses) in the second lens module 140, so a F denotes an arbitrary depth. The pupil function and the phasor jointly define an optical transfer function (OTF). In addition, the inverse Fourier transform of the optical transfer function can be regarded as a point spread function (PSF). As a result, the light field perceived by the viewer is the sum of the convolutions of the input sub-view images with corresponding point spread functions of the aperture device 130. In the embodiment, since light transport and image formation model can be expressed by differentiable functions, the display pipeline of the near-eye light-field display apparatus 100 can be modeled as a differentiable function.

In an embodiment, the display pipeline of the near-eye light-field display apparatus 100 may have various design variables (e.g., hyperparameters), such as n, k, l, and a type value t of a coded aperture. For example, n denotes the number of input sub-view images, and k denotes the number of display inputs and the number of coded apertures, and l denotes the resolution of the coded apertures, and the type value t of a coded aperture denotes whether the coded aperture is implemented by a binary format or a continuous format.

FIG. 4 is a method for displaying a light field in accordance with an embodiment of the invention. Please refer to FIG. 1 and FIG. 4.

In step S410, the display module 110 displays light-field data. For example, the light-field data may include a plurality of first images that are displayed in a predetermined order, where the first images may be sub-view images of a light field or coded sub-view images of a coded light field.

In step S420, the first lens module 120 collimates light rays emitted from the display module 110. For example, the first lens module 120 comprises a plurality of first lenses, which comprise a meniscus lens 121, a biconvex lens 121, a biconcave lens 123, and a plano-convex lens 124 arranged in series.

In step S430, the aperture device 130 is controlled to generate a plurality of coded apertures, wherein the collimated light rays are modulated by the coded apertures. For example, the coded apertures generated by the aperture device 130 correspond to the first images, and each of the coded apertures is generated in the predetermined order in synchronization with each of the first images displayed by the display module 110.

In step S440, the second lens module 140 focuses the modulated light rays on an image plane to form a real image. For example, the modulated light rays corresponding to an output coded sub-view image are emitted into the eye pupil of a viewer of the near-eye light-field display apparatus 100 through the eyepiece module 180.

In view of the above, a near-eye light-field display apparatus and a method for displaying a light field are provided, which are capable of using a coded time-domain multiplexing technique in the display pipeline of the near-eye light-field display apparatus, and using an artificial-intelligence model to optimize the sub-view images to be displayed on the display module and to optimize the aperture patterns generated by the aperture device. Thus, the problem of low input angular resolution and aliasing of the output light field in conventional SDM/TDM light-field displays can be solved by the near-eye light-field display apparatus provided in the invention.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A near-eye light-field display apparatus, comprising:
   a display module, configured to display light-field data, wherein the light-field data comprises a plurality of first images that are displayed in a predetermined order;
   a first lens module, configured to collimate light rays emitted from the display module;
   an aperture device, configured to generate a plurality of coded apertures wherein the collimated light rays are modulated by the coded apertures;
   a second lens module, configured to focus the modulated light rays on an image plane to form a real image;
   a control circuit, controlling the display module and the aperture device,
   wherein in response to the first images being sub-view images of a light field, the control circuit performs a light-field encoding network to transform the sub-view images of the light field into coded sub-view images to be displayed on the display module.

2. The near-eye light-field display apparatus as claimed in claim 1, wherein the coded apertures correspond to the first images, and each of the coded apertures is generated in the predetermined order in synchronization with each of the first images displayed by the display module.

3. The near-eye light-field display apparatus as claimed in claim 1, wherein the first images are the sub-view images of a light field.

4. The near-eye light-field display apparatus as claimed in claim 1, wherein the first images are the coded sub-view images of a coded light field.

5. The near-eye light-field display apparatus as claimed in claim 4, wherein the coded light field is a transformed light field.

6. The near-eye light-field display apparatus as claimed in claim 1, wherein the first lens module comprises a plurality of first lenses, which comprise a meniscus lens, a biconvex lens, a biconcave lens, and a plano-convex lens arranged in series.

7. The near-eye light-field display apparatus as claimed in claim 1, wherein the second lens module comprises a plurality of second lenses, which comprise a plano-convex lens, a biconcave lens, a biconvex lens, and a meniscus lens arranged in series.

8. The near-eye light-field display apparatus as claimed in claim 1, wherein the focused light rays reach an eye pupil of a viewer of the near-eye light-field display apparatus through an eyepiece module.

9. The near-eye light-field display apparatus as claimed in claim 1, wherein the light-field encoding network is a convolutional neural network.

10. The near-eye light-field display apparatus as claimed in claim 1, wherein the control circuit and the light-field encoding network are implemented by a hardware circuit.

11. The near-eye light-field display apparatus as claimed in claim 1, wherein the control circuit is implemented by a central processing unit, a general-purpose processor, or a microcontroller.

12. The near-eye light-field display apparatus as claimed in claim 11, wherein each coded sub-view image defines a pupil function of the aperture device of the near-eye light-field display apparatus, wherein the pupil function and a phasor jointly define an optical transfer function, and an output sub-view image of the optical transfer function is obtained by performing convolution on an input sub-view image and a point spread function, wherein the point spread function is an inverse Fourier transform of the optical transfer function.

13. A method for displaying a light field, for use in a near-eye light-field display apparatus, wherein the near-eye light-field display apparatus comprises a display module, a first lens module, an aperture device, and a second lens module, the method comprising:

utilizing the display module to display light-field data, wherein the light-field data comprises a plurality of first images that are displayed in a predetermined order, wherein the first images are sub-view images of the light field or coded sub-view images of a coded light field;

utilizing the first lens module to collimate light rays emitted from the display module;

controlling the aperture device to generate a plurality of coded apertures, wherein the collimated light rays are modulated by the coded apertures; and utilizing the second lens module to focus the modulated light rays on an image plane to form a real image;

in response to the first images being sub-view images of a light field, performing a light-field encoding network to transform the sub-view images of the light field into the coded sub-view images to be displayed on the display module.

14. The method as claimed in claim 13, wherein the coded apertures correspond to the first images, and the method further comprises:

generating each of the coded apertures in the predetermined order in synchronization with each of the first images displayed by the display module.

15. The method as claimed in claim 13, wherein each coded sub-view images defines a pupil function of the aperture device of the near-eye light-field display apparatus, wherein the pupil function and a phasor jointly define an optical transfer function, and an output sub-view image of the optical transfer function is obtained by performing convolution on an input sub-view image and a point spread function, wherein the point spread function is an inverse Fourier transform of the optical transfer function.

\* \* \* \* \*